United States Patent
Chang

(10) Patent No.: US 9,606,289 B2
(45) Date of Patent: Mar. 28, 2017

(54) LIGHT GUIDE PLATE AND BACKLIGHT MODULE HAVING SAME

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 81 days.

(21) Appl. No.: 14/555,693

(22) Filed: Nov. 28, 2014

(65) Prior Publication Data

US 2015/0153505 A1    Jun. 4, 2015

(30) Foreign Application Priority Data

Dec. 2, 2013  (TW) .............................. 102143961 A

(51) Int. Cl.
   *F21V 7/04*    (2006.01)
   *F21V 8/00*    (2006.01)

(52) U.S. Cl.
   CPC ......... *G02B 6/0091* (2013.01); *G02B 6/0031* (2013.01)

(58) Field of Classification Search
   CPC ......... F21K 9/52; G02B 6/005; G02B 6/0028; G02B 6/0091; G02B 6/0031; G02B 6/0036; G02B 6/0051; G02B 6/0055; G02B 6/0013; G02B 6/0076; G02B 6/0038; G02B 1/10; G02F 1/133553; G02F 1/133555; G02F 1/133605

USPC .............................. 362/6, 607, 608, 609, 615
See application file for complete search history.

(56) References Cited

U.S. PATENT DOCUMENTS

| | | | | |
|---|---|---|---|---|
| 2005/0265029 | A1* | 12/2005 | Epstein | G02B 3/0056 362/339 |
| 2008/0031011 | A1* | 2/2008 | Hayashi | G02B 6/0016 362/617 |
| 2009/0052204 | A1* | 2/2009 | Kawashima | G02B 6/0078 362/555 |
| 2009/0066877 | A1* | 3/2009 | Abe | G02B 6/0021 349/62 |
| 2009/0190068 | A1* | 7/2009 | Kawamura | B82Y 20/00 349/65 |
| 2010/0220498 | A1* | 9/2010 | Awano | G02B 5/045 362/611 |

\* cited by examiner

*Primary Examiner* — Jason Moon Han
*Assistant Examiner* — Omar Rojas Cadima
(74) *Attorney, Agent, or Firm* — Zhigang Ma

(57) ABSTRACT

A light guide plate in a backlight module includes a light guide layer, a carrier layer, and a reflection sheet. The light guide layer includes a first surface and an opposite second surface. A plurality of light guide outlets is formed on the first surface. The carrier layer includes a third surface and an opposite fourth surface. The third surface is adhered with the second surface. The carrier layer defines a receiving groove having a fifth surface parallel with the third surface. A plurality of through holes passes through the fifth surface to the third surface to expose portions of the second surface. The reflection sheet is arranged on the first surface and is aligned with the receiving groove.

14 Claims, 3 Drawing Sheets

LIGHT GUIDE PLATE AND BACKLIGHT MODULE HAVING SAME

FIELD

The subject matter herein generally relates to equipment lighting.

BACKGROUND

To adapt to a tendency for thinner electric products, a thin and rigid light guide plate is needed.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
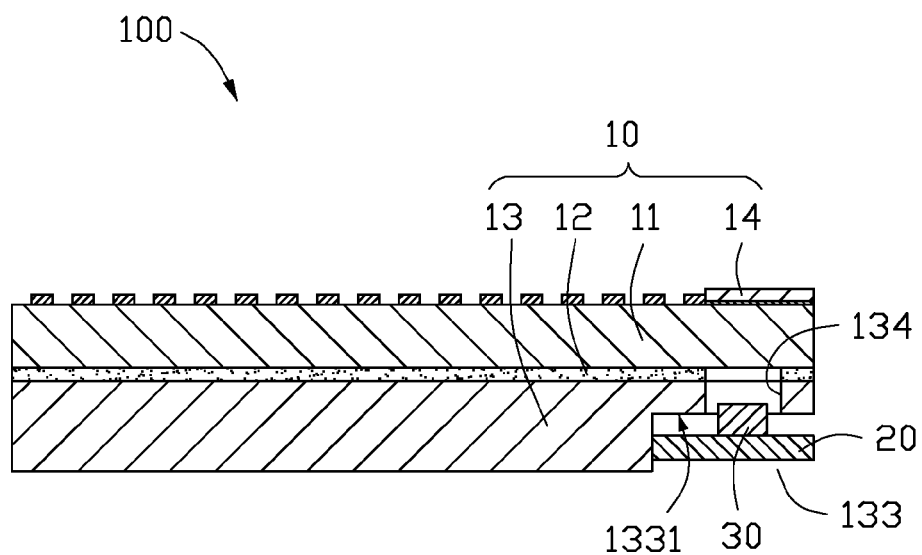
FIG. 1 is a cross-sectional view of a backlight module according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A light guide plate includes a light guide layer, a carrier layer, and a reflection sheet. The light guide layer includes a first surface and a second surface opposite to and substantially parallel with the first surface. A plurality of light guide outlets is formed on the first surface. The carrier layer includes a third surface and a fourth surface opposite to and substantially parallel with the third surface. The third surface is adhered with the second surface. The carrier layer defines a receiving groove from the fourth surface toward the third surface, and the receiving groove includes a fifth surface parallel with the third surface. A plurality of through holes is defined to pass through the carrier layer from the fifth surface to the third surface, portions of the second surface being exposed from the through holes. The reflection sheet is arranged on the first surface, and the reflection sheet is aligned with the receiving groove, and configured to reflect light passing through the through holes.

A backlight module includes a light guide plate and a plurality of light sources. The light guide plate includes a light guide layer, a carrier layer, and a reflection sheet. The light guide layer includes a first surface and a second surface opposite to and substantially parallel with the first surface. A plurality of light guide outlets is formed on the first surface. The carrier layer includes a third surface and a fourth surface opposite to and substantially parallel with the third surface. The third surface is adhered with the second surface. The carrier layer defines a receiving groove from the fourth surface toward the third surface, and the receiving groove includes a fifth surface parallel with the third surface. A plurality of through holes is defined to pass through the carrier layer from the fifth surface to the third surface, portions of the second surface being exposed from the through holes. The reflection sheet is arranged on the first surface, and the reflection sheet is aligned with the receiving groove, and configured to reflect light passing through the through holes. The light sources are arranged in the receiving groove to face the fifth surface, the light sources correspond to the through holes.

Figure 2:
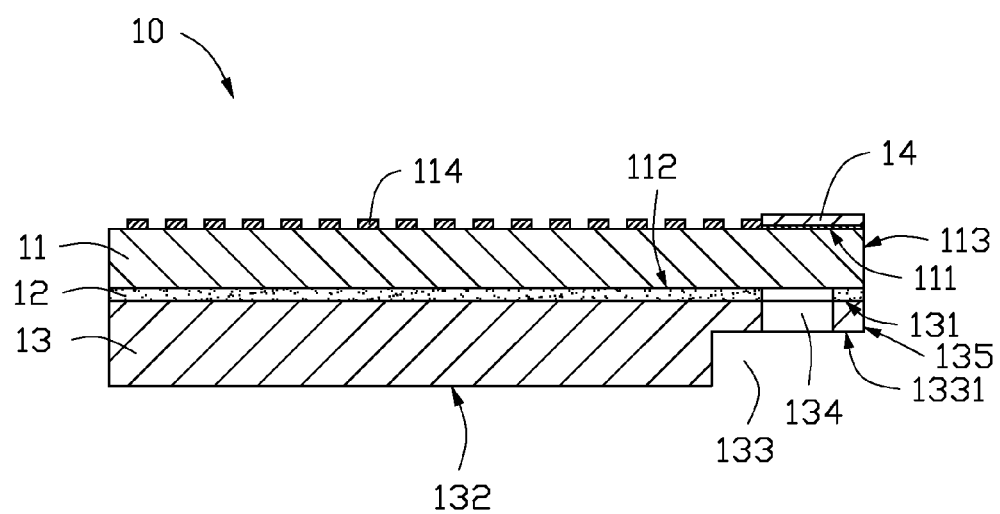
FIG. 2 is a cross-sectional view of a light guide plate of the backlight module in FIG. 1.

FIGS. 1-2 illustrate a first embodiment of a backlight module 100 including a light guide plate 10, a printed circuit board 20, and a plurality of light sources 30.

The light guide plate 10 includes a light guide layer 11, a transparent adhering layer 12, a carrier layer 13, and a reflection sheet 14.

The light guide layer 11 can be made of glass or polymethyl methacrylate (PMMA). In this embodiment, the light guide layer 11 is made of ultra-thin glass. A thickness of the light guide layer 11 is in a range from 0.03 millimeter to 0.2 millimeter.

The light guide layer 11 is substantially rectangular and includes a first surface 111, a second surface 112 opposite to and substantially parallel with the first surface 111, and a first side surface 113 substantially perpendicularly connected between the first surface 111 and the second surface 112. A plurality of light guide outlets 114 project from the first surface 111, and extend away from the second surface 112. In this embodiment, the light guide outlets 114 are in an array, and are uniformly distributed. The light guide outlets 114 can be hemispherical, cylindrical, tapered, or other columnar shape.

The light guide outlets 114 are formed by a method as following. Firstly, a coat layer is formed by uniformly coating epoxy or PMMA on the first surface 111. Secondly, a mold defining a plurality of grooves corresponding to the light guide outlets 114 is pressed on the coat layer to form the light guide outlets 114. In other embodiments, the light guide outlets 114 can be formed by a laser cutting process.

The second surface 112 can be a roughened surface formed by an abrasive blasting process.

The transparent adhering layer 12 is adhered between the second surface 112 of the light guide layer 11 and the carrier layer 13. A refractive index of the transparent adhering layer 12 is equal to or less than that of the light guide layer 11.

The carrier layer 13 is also substantially rectangular and is made of rigid material. In this embodiment, the carrier layer 13 is made of stainless steel. The carrier layer 13 includes a third surface 131, a fourth surface 132 opposite to and substantially parallel with the third surface 131, and a second side surface 135. The third surface 131 is adhered to the transparent adhering layer 12, and faces the second surface 112. The third surface 131 is a reflective surface formed by a polishing process. The carrier layer 13 defines a receiving groove 133 from the fourth surface 132 toward the third surface 131. The receiving groove 133 includes a fifth surface 1331 parallel with the third surface 131. The second side surface 135 is substantially perpendicularly connected between the third surface 131 and the fifth surface 1331. The first side surface 113 is co-planar with the second side surface 135. The plurality of through holes 134 is defined so as to pass through the carrier layer 13 from the fifth surface 1331 to the third surface 131. The through holes 134 are in one or more lines. In this embodiment, a reflection film is formed on a inner wall of each through hole 134. A portion of the second surface 112 is exposed from each through hole 134.

In other embodiments, the third surface 131 can be other than reflective, but a reflection film can be formed on the second surface 112 except for the exposed portions. The reflection film can be copper film or silver film.

The reflection sheet 14 is substantially strip-shaped. The reflection sheet 14 is adhered on a portion of the first surface 111 by a transparent adhesive. The reflection sheet 14 is aligned with the receiving groove 133 and is configured to reflect light passing through the through holes 134. The reflection sheet 14 can be a reflection shield or a reflection grating. The reflection shield can be formed by a vaporizing plating process, and the reflection shield can be a copper film or a silver film. The reflection grating can be formed by a laser cutting process.

The printed circuit board 20 is received in the receiving groove 133. The light sources 30 are arranged in one or more lines on a surface of the printed circuit board 20 facing the fifth surface 1331. The light sources 30 correspond to the through holes 134, and each of the light sources 30 is partly received in one through hole 134. In this embodiment, the light sources 30 are light-emitting diodes.

In use, light beams emitted from the light sources 30 pass through the through holes 134 into the light guide layer 11. The light beams emitted from the light guide layer 11 are reflected by the reflection sheet 14, and then pass into and are dispersed in the light guide layer 11. Then, some of the light beams are reflected by a surface of the transparent adhesive layer 12, and some of the light beams are refracted and pass into the transparent adhesive layer 12. The light beams in the transparent adhesive layer 12 are then reflected by the third surface 131 to pass again into the transparent adhesive layer 12 and the light guide layer 11. Then, the light beams reflected by a surface of the transparent adhesive layer 12 and the light beams reflected by the third surface 131 are all emitted from the first surface 111 of the light guide layer 11.

If the reflection sheet 14 is a reflection grating, in other embodiments, an optical reflection sheet can be adhered on a surface of the reflection sheet 14 away from the light guide layer 11, to reflect light beams diffracted by the reflection sheet 14.

Figure 3:
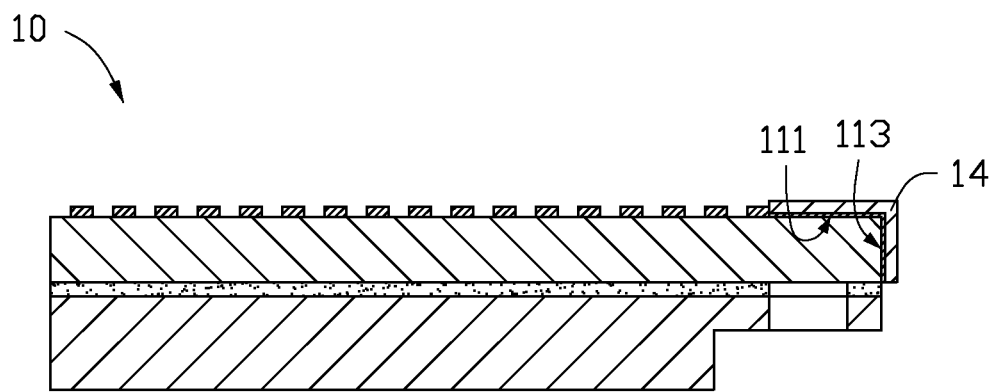
FIG. 3 shows a cross-sectional view of a back light module according to a second embodiment.

If the reflection sheet 14 is a reflection shield, in other embodiments, as illustrated in FIG. 3, the reflection sheet 14 can also be adhered on the side surface 113.

In other embodiments, the reflection sheet 14 can also be a multilayer film, such as a transmission grating adhered with a reflection film, and the transmission grating can correspond to the through holes 134 and be adhered with the first surface 111, and the reflection film can be adhered on a surface of the transmission grating away from the light guide layer 11.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including, the full extent established by the broad general meaning of the terms used in the claims. It will therefore be appreciated that the embodiments described above may be modified within the scope of the claims.

What is claimed is:

1. A light guide plate, comprising:
    a light guide layer having a first surface and a second surface opposite to and substantially parallel with the first surface, at least one light guide outlet formed on the first surface;
    a carrier layer having a third surface and a fourth surface opposite to and substantially parallel with the third surface, the third surface adhered with the second surface, the carrier layer defining a receiving groove from the fourth surface toward the third surface, the receiving groove having a fifth surface parallel with the third surface;
    a transparent adhering layer adhered between the second surface of the light guide layer and the carrier layer, at least one through hole passing through the carrier layer and the transparent adhering layer from the fifth surface to the second surface, a portion of the second surface being exposed from each through hole;
    and wherein the second surface is a roughened surface formed by an abrasive blasting process; wherein the third surface is a reflective surface formed by a polishing process; and
    a reflection sheet arranged on the first surface, the reflection sheet being aligned with the receiving groove, and configured to reflect light passing through at least one through hole.

2. The light guide plate of claim 1, wherein a thickness of the light guide layer is in a range from 0.03 millimeter to 0.2 millimeter.

3. The light guide plate of claim 1, further comprising a reflection film formed on the second surface except for each exposed portion.

4. The light guide plate of claim 1, wherein the light guide outlets project from the first surface.

5. The light guide plate of claim 1, wherein the reflection sheet is a reflection shield.

6. The light guide plate of claim 1, wherein the reflection sheet is a multilayer film having a transmission grating and a reflection film adhered with the transmission grating, the transmission grating corresponds to the through hole and is adhered with the first surface, and the reflection film is adhered on a surface of the transmission grating away from the light guide layer.

7. The light guide plate of claim 1, wherein the reflection sheet is a reflection shield, the light guide layer further having a first side surface substantially perpendicularly connected between the first surface and the second surface, the carrier layer further having a second side surface, the second side surface is substantially perpendicularly connected between the third surface and the fifth surface , the first side surface is co-planar with the second side surface, the reflection sheet is also adhered on the first side surface.

8. A back light module, comprising:
    a light guide plate, comprising:
        a light guide layer having a first surface and a second surface opposite to and substantially parallel with the first surface, at least one light guide outlet formed on the first surface;
        a carrier layer having a third surface and a fourth surface opposite to and substantially parallel with the third surface, the third surface adhered with the second surface, the carrier layer defining a receiving groove from the fourth surface toward the third surface;

a transparent adhering layer adhere between the second surface of the light guide layer and the carrier layer, at least one through hole passing through the carrier layer and the transparent adhering layer from the fifth surface to the second surface, a portion of the second surface being exposed from each through hole;

and wherein the second surface is a roughened surface formed by an abrasive blasting process; wherein the third surface is a reflective surface formed by a polishing process; and at least one light source arranged in the receiving groove to face the fifth surface, each light source correspond to one through hole.

9. The back light module of claim 8, further comprising a printed circuit board received in the receiving groove, the light sources being arranged on a surface of the printed circuit board, each of the light sources being partly received in one through hole.

10. The back light module of claim 8, wherein the light guide plate further comprises a reflection film formed on the second surface except for each exposed portion.

11. The back light module of claim 8, wherein the light guide outlets project from the first surface.

12. The back light module of claim 8, wherein the reflection sheet is a reflection shield.

13. The back light module of claim 8, wherein the reflection sheet is a multilayer film having a transmission grating and a reflection film adhered with the transmission grating, the transmission grating corresponds to the through hole and is adhered with the first surface, and the reflection film is adhered on a surface of the transmission grating away from the light guide layer.

14. The back light module of claim 8, wherein the reflection sheet is a reflection shield, the light guide layer further having a first side surface substantially perpendicularly connected between the first surface and the second surface, the carrier layer further having a second side surface, the second side surface is substantially perpendicularly connected between the third surface and the fifth surface, the first side surface is co-planar with the second side surface, the reflection sheet is also adhered on the first side surface.

* * * * *